US009696981B2

(12) United States Patent
Martin et al.

(10) Patent No.: US 9,696,981 B2
(45) Date of Patent: Jul. 4, 2017

(54) INCREMENTAL DEPLOYMENT OF COMPUTER SOFTWARE PROGRAM LOGIC

(75) Inventors: Sean James Martin, Webster, MA (US); Simon Luke Martin, Brookline, MA (US)

(73) Assignee: CAMBRIDGE SEMANTICS, INC., Boston, MA (US)

(*) Notice: Subject to any disclaimer, the term of this patent is extended or adjusted under 35 U.S.C. 154(b) by 191 days.

(21) Appl. No.: 13/457,925

(22) Filed: Apr. 27, 2012

(65) Prior Publication Data

US 2012/0278902 A1 Nov. 1, 2012

Related U.S. Application Data

(60) Provisional application No. 61/479,621, filed on Apr. 27, 2011.

(51) Int. Cl.
*G06F 9/445* (2006.01)
*G06F 9/44* (2006.01)

(52) U.S. Cl.
CPC ............... *G06F 8/65* (2013.01); *G06F 8/313* (2013.01)

(58) Field of Classification Search
CPC ..... G06F 9/463; G06F 8/313; H04L 65/4084; H04L 67/34; H04L 69/00
USPC ........ 709/203, 225, 216, 231; 713/151, 192; 726/2, 3; 705/1.1, 26.1, 59; 719/313
See application file for complete search history.

(56) References Cited

U.S. PATENT DOCUMENTS 8,312,451 B2 * 11/2012 Poole ........................ G06F 8/61
717/168

2002/0042833 A1 * 4/2002 Hendler ............ H04L 29/06027
709/231
2004/0103142 A1 * 5/2004 Becher .................... H04L 63/12
709/203
2007/0038520 A1 * 2/2007 Grey .................. G06Q 30/0601
705/26.1
2009/0119678 A1 * 5/2009 Shih et al. ..................... 719/313
2010/0248699 A1 * 9/2010 Dumais ........................ 455/414.1

OTHER PUBLICATIONS

Kuacharoen et al., Software Streaming via Block Streaming, 2008.*

* cited by examiner

*Primary Examiner* — Eleni Shiferaw
*Assistant Examiner* — Huan V Doan
(74) *Attorney, Agent, or Firm* — Wilmer Cutler Pickering Hale and Dorr LLP

(57) ABSTRACT

Systems and methods for requesting computer software program logic by a client computing device from a server are provided. The method at the server comprises receiving a request for the computer software program logic from the client device along with a first list comprising details about multiple modules running on the client device; determining a second list comprising details about multiple modules required to deploy the computer software program logic on the client device; checking whether the modules of the second list need to be substituted based on their availability or suitability; updating the second list; checking whether the client device has permission rights for accessing the modules of the updated second list; and sending an object comprising the modules of the updated second list to the client device, the updated second list comprising details about the modules required for deployment of logic on the client device.

20 Claims, 10 Drawing Sheets

INCREMENTAL DEPLOYMENT OF COMPUTER SOFTWARE PROGRAM LOGIC

CROSS-REFERENCE TO RELATED APPLICATIONS

This application claims the benefit of U.S. Provisional Patent Application No. 61/479,621, filed Apr. 27, 2011, which application is hereby incorporated by reference in its entirety.

BACKGROUND

Field of Various Embodiments

The present disclosure generally relates to computer networks, and, more specifically, to incremental deployment of computer software program logic on client devices in a network.

Related Art

Until recently, computer application software program behavior has been somewhat fixed in nature. This means generally that computer software programs are only able to operate with previously determined data sources and specific data structures using prearranged computer code logic. Thus, users of such software programs are able to operate these software programs only within the narrow bounds of the program's pre-encoded software instructions. This may limit the users to preexisting fixed views, editors and visualizations of their data, and the unchanging repeatable operations on that data as specifically supported by the logic coded into the software program they were using. However, more recently, advanced software programs can locate and invoke previously unknown (to the program's original designer or coder) remote computer software programs and new logic to act on data and for remote processing or local processing at the user's behest (or in some cases automatically). Automated evolution or extension of a software program's initial functional capabilities can occur when individual additional program behaviors or new data types are introduced that were not previously provided for, nor perhaps even contemplated by the original designers and coders of the software program. For example, computer software programs that allow their end-users (or even automated procedures) to determine, as they make use of the program or reconfigure the program options, which data they want to edit, visualize or otherwise access, as well as which additional remote and local software program services can be invoked with that data as input or output. The reasons why the dynamic extension of software program functionality might be necessary include adding the facility to load or interact with hitherto unseen data types, provide new editors or visualizations for data or to provide alternative algorithmic processing capabilities.

Therefore, a need exists for systems and methods for adding the additional data types and incremental deployment of computer software programs on various computing devices in a network.

SUMMARY OF VARIOUS EMBODIMENTS

According to various embodiments, the present disclosure describes systems and methods for requesting computer software program logic by a client computing device from a server in a network. The method comprises: receiving a request for computer software program logic from a client computing device along with a first list comprising details about one or more modules running on the client computing device; determining, via at least one processor, a second list comprising details of one or more modules required to deploy the computer software program logic on the client computing device; checking, via the at least one processor, whether the one or more modules of the second list need to be substituted based on their availability on the server; updating, via the at least one processor, the second list based at least in part on the check performed; checking, via the at least one processor, whether the client computing device has permission rights for accessing the one or more modules of the updated second list; and transmitting, via the at least one processor, an object comprising the one or more modules of the updated second list to the client computing device based at least in part on the check performed, wherein the updated second list comprises details of the one or more modules required for deployment of computer software program logic on the client computing device.

According to various embodiments, the present disclosure further describes a computer software program logic deployment system comprising a client computing device and a server. The client computing device includes a first transceiver configured to send a request for the computer software program logic along with a first list comprising details about one or more modules running on the client computing device; and receive an object comprising one or more modules required for deployment of the computer software program logic. The server comprises a second transceiver configured to receive a request for the computer software program logic along with the first list from the client computing device; and send an object including the one or more modules required for deployment of the computer software program logic to the client computing device. The server further includes a memory comprising a database configured to store modules including software code modules and code libraries. A runtime assembler program may also be located within the server and be configured to: determine a second list including details about one or more modules required to deploy the computer software program logic; and update the second list by, wherein updating comprises: removing the one or more modules to which the client computing device does not have access permission rights from the second list; and adding details of one or more substitute modules corresponding to the removed one or modules in the second list. The server may also comprise a context control manager configured to check whether one or more modules of the second list need to be substituted based on at least one of context or availability of these modules on the server; and an access control manager configured to check whether the client computing device has permission rights for accessing one or more modules of the second list and the updated second list.

Embodiments of the present disclosure further provide a non-transitory computer program product comprising at least one computer readable medium having computer-readable program code portions embodied thereon to perform business center operations, the computer-readable program code portions being configured to perform the steps of: receiving a request for the computer software program logic from the client computing device along with a first list comprising details about one or more modules running on the client computing device; determining a second list comprising details about one or more modules required to deploy the computer software program logic on the client computing device; checking whether the one or more modules of the second list need to be substituted based on their availability on the server; updating the second list based on the check performed; checking whether the client computing device has permission rights for accessing the one or more modules of the updated second list; and sending an object comprising the one or more modules of the updated second list to the client computing device based on the check performed, wherein the updated second list comprises details about the one or more modules required for deployment of computer software program logic on the client computing device.

BRIEF DESCRIPTION OF THE FIGURES

Figure 1:
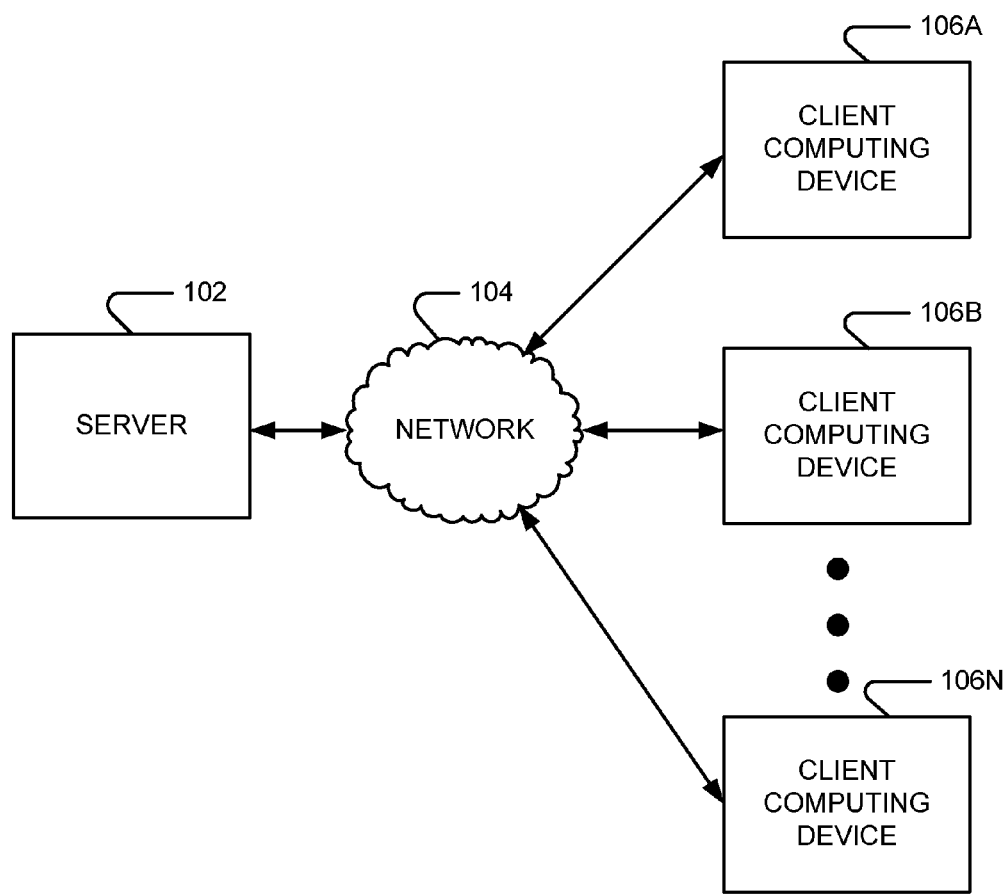
Figure 2:
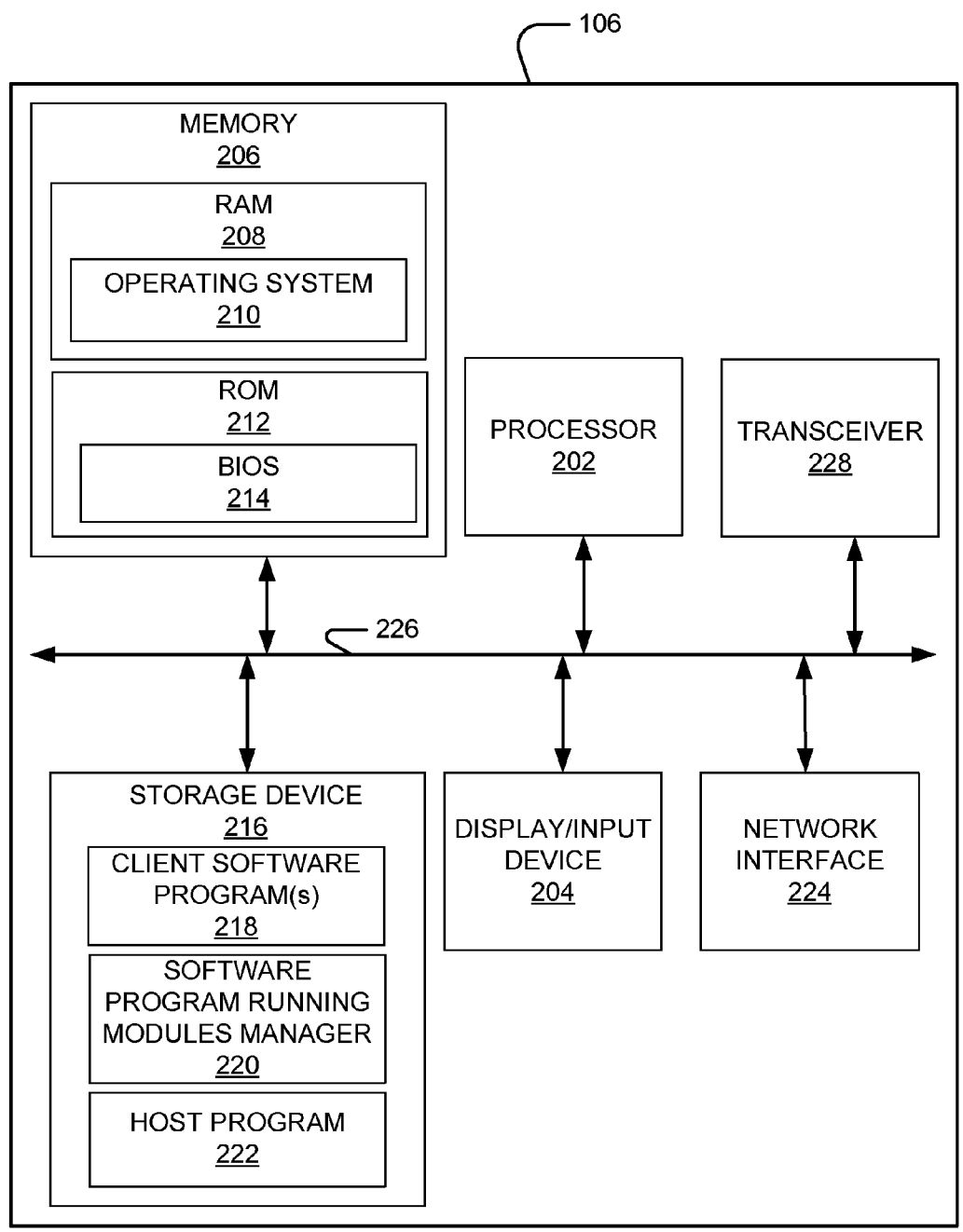
Figure 3:
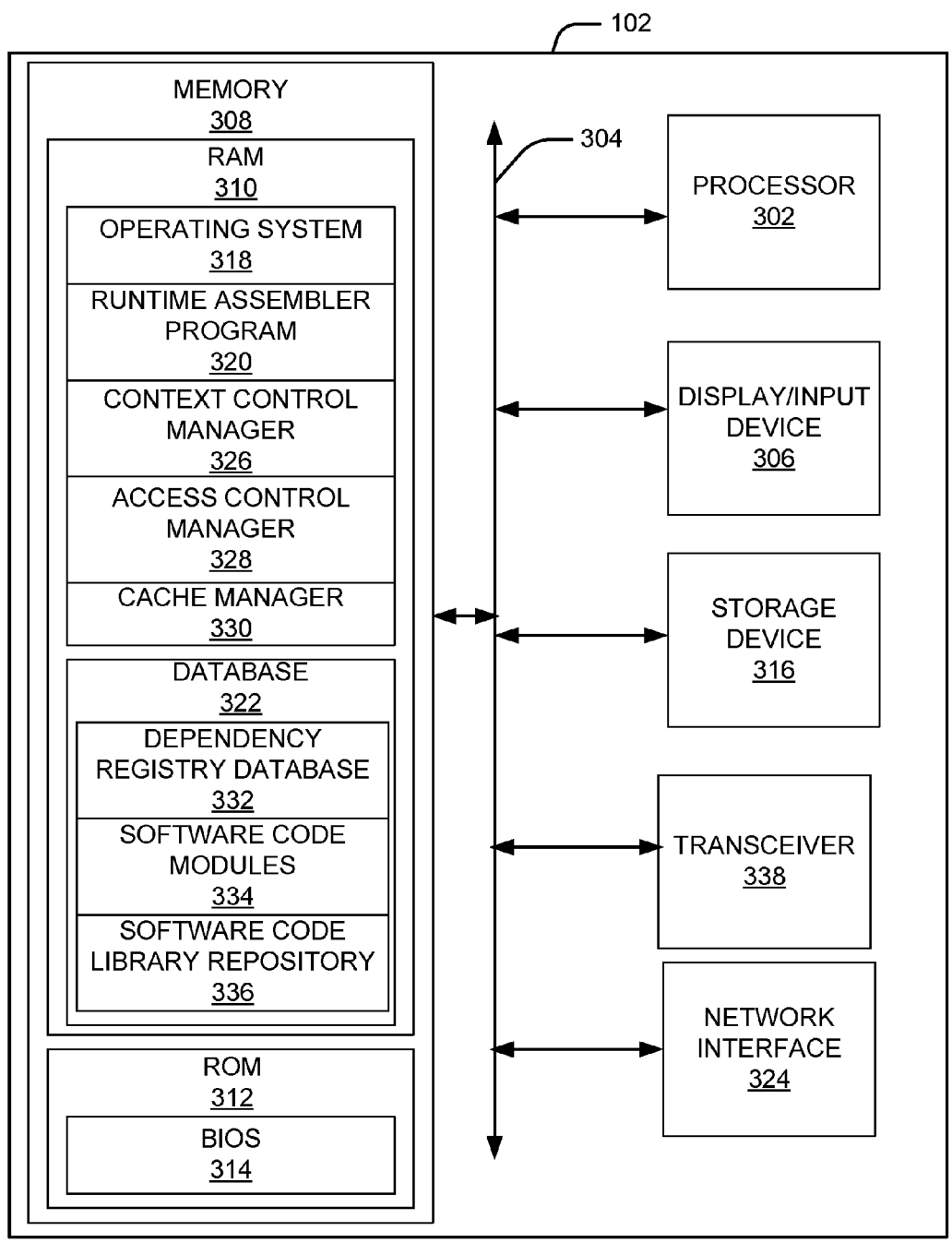
Figure 4A:
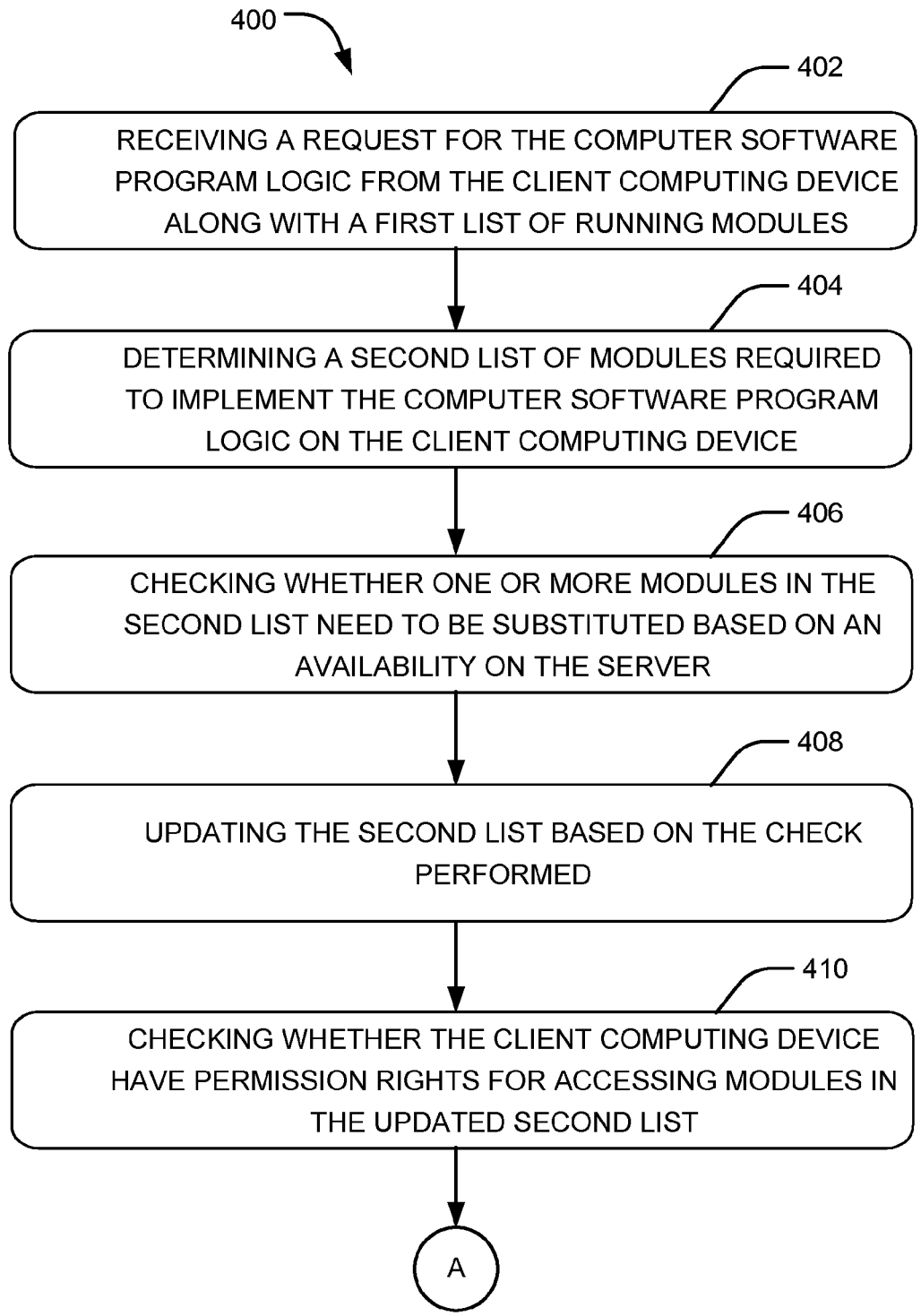
Figure 4B:
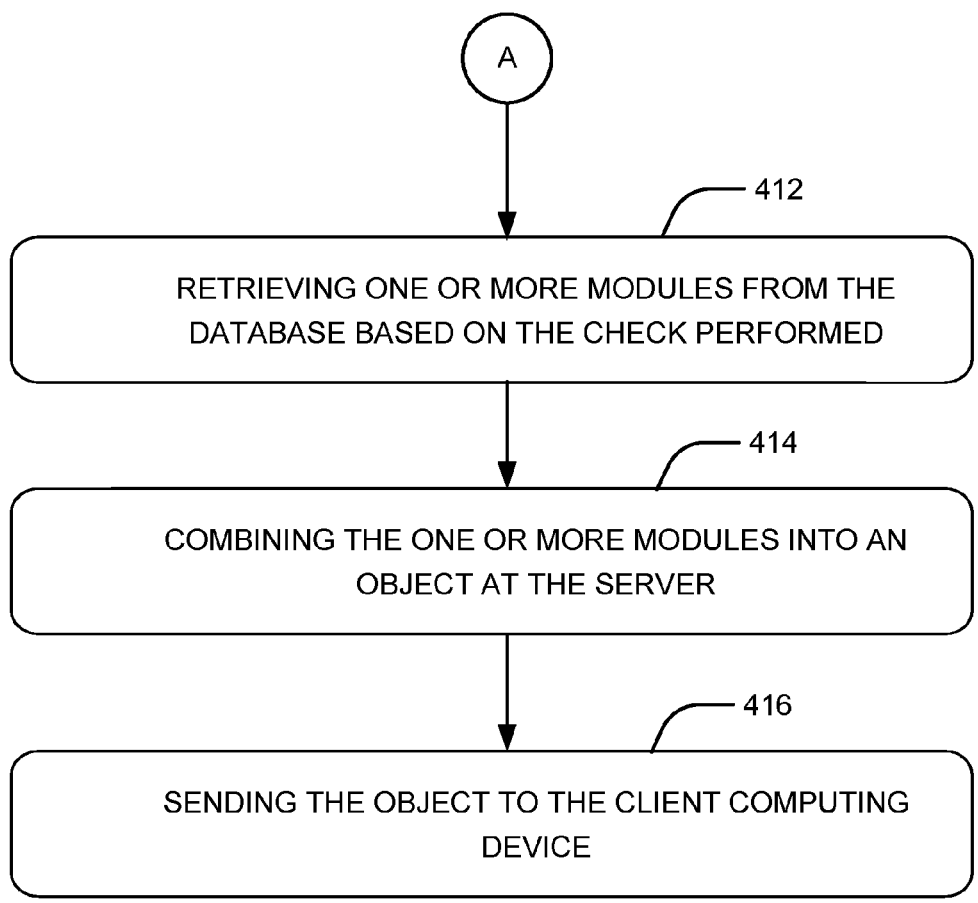

Having thus described the invention in general terms, reference will now be made to the accompanying drawings, which are not necessarily drawn to scale, and wherein:

FIG. 1 illustrates an environment where various embodiments of the present disclosure may function;

FIG. 2 illustrates exemplary structural components of the client computing device of FIG. 1, in accordance with various embodiments of the present disclosure;

FIG. 3 illustrates exemplary structural components of the server of FIG. 1, in accordance with various embodiments of the present disclosure;

FIGS. 4A-4B are flowcharts illustrating a method for receiving a computer software program logic on the client computing device from the server in a network, in accordance with various embodiments of the present disclosure; and FIGS. 5A-5E are flowcharts illustrating a method for incremental deployment of computer software program logic on the client computing device, in accordance with various embodiments of the present disclosure.

While embodiments of the present disclosure are amendable to various modifications and alternative forms, specific embodiments are shown by way of example in the drawings and are described in detail. It should be understood, however, that the drawings and detailed description thereto are not intended to limit the present disclosure to the particular form disclosed, but on the contrary, the intention is to cover all modifications, equivalents, and alternatives falling within the spirit and scope of the present disclosure as defined by the appended claims.

DETAILED DESCRIPTION OF VARIOUS EMBODIMENTS

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Unless otherwise defined, all technical and scientific terms used herein have the same meaning as commonly understood by one of ordinary skill in the art to which this invention belongs. The terminology used in the description is for describing particular embodiments only and is not intended to be limiting to embodiments of the present invention. As used in the description, the singular forms "a," "an," and "the" are intended to include the plural forms as well, unless the context clearly indicates otherwise. The term "or" is used herein in both the alternative and conjunctive sense, unless otherwise indicated. The terms "illustrative" and "exemplary" are used to be examples with no indication of quality level.

Apparatuses, Methods, Systems, and Computer Program Products

As should be appreciated, various embodiments may be implemented in various ways, including as methods, apparatus, systems, or computer program products. Accordingly, various embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

1. Exemplary Environment Architecture

FIG. 1 illustrates an environment where various embodiments of the present disclosure may function. As shown in FIG. 1, the environment may include a server 102, a network 104, and one or more client computing devices 106A-N. Each of the components of the environment may be in electronic communication with, for example, one another over the same or different wireless or wired networks 104. According to various embodiments, the one or more networks 104 may be capable of supporting communication in accordance with any one or more of a number of second-generation (2G), 2.5G, third-generation (3G), and/or fourth-generation (4G) mobile communication protocols, or the like. More particularly, the one or more networks 104 may be capable of supporting communication in accordance with 2G wireless communication protocols IS-136 (TDMA), GSM, and IS-95 (CDMA). Also, for example, the one or more networks 104 may be capable of supporting communication in accordance with 2.5G wireless communication protocols GPRS, Enhanced Data GSM Environment (EDGE), or the like. In addition, for example, the one or more networks 104 may be capable of supporting communication in accordance with 3G and 4G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the environment may be configured to communicate with one another in accordance with techniques such as, for example, radio frequency (RF), Bluetooth™, infrared (IrDA), or any of a number of different wired and/or wireless networking techniques, including a wired or wireless Personal Area Network ("PAN"), Local Area Network ("LAN"), Metropolitan Area Network ("MAN"), Wide Area Network ("WAN"), or the like.

Still further, although the client computing devices 106A-N and the server 102 are illustrated in FIG. 1 as communicating with one another over the same network 104, these devices may likewise communicate over multiple, separate networks. For example, while one of the client computing devices 106A-N may communicate with the server 102 over a wireless personal area network (WPAN) using, for example, Bluetooth techniques, another of the client computing devices 106A-N communicate with the server 102 over a wireless wide area network (WWAN), for example, in accordance with EDGE, or some other 2.5G wireless communication protocol. It should be understood that according to various embodiments, any of a variety of combinations of network types and/or capabilities may be employed, as may be desirable for particular applications.

Returning to FIG. 1, while that figure illustrates the various system entities as separate, standalone entities, the various embodiments are not limited to this particular architecture. Each of the client computing devices 106A-N may communicate or exchange information with the server 102. The client devices 106A-N may request one or more resources such as, but are not limited to, a software program, an applet, a web page, and so forth from the server 102. The server 102 may provide the client devices 106A-N with the requested resources. The server 102 may be a computing device such as the non-limiting example of a computer dedicated to serve one or more requests from the client devices 106A-N. In some embodiments, the server 102 may perform some computational task on behalf of the client devices 106A-N. As non-limiting examples, however, the server 102 may, according to various embodiments, be a database server, a file server, an application server, a communications server, a mail server, a print server, a web server, or some other kind of server depending on the computing service the server offers to the client computing devices 106A-N in the network 104.

2. Exemplary Client Device 106 Architecture

FIG. 2 illustrates exemplary structural components of a client device 106, in accordance with various embodiments of the present disclosure. It should be understood that while the client device 106 is singular in form, such hereinafter refers to at least one client device of the client devices 106A-N of FIG. 1, as previously described herein. The term "client device" is used generically to refer to any computer, computing device, desktop, notebook or laptop, distributed system, server, gateway, switch, or other processing device adapted to perform the functions described herein.

The client device 106 may according to various embodiments include one or more components that are functionally similar to those of the server 102, as will be described in further detail below. In certain embodiments, the client device 106 may include a processor 202 that communicates with other elements via a system interface or a bus 226. The processor 202 may be embodied in a number of different ways. As a non-limiting example, the processor 202 may be embodied as a processing element, a coprocessor, a controller or various other processing devices including integrated circuits such as, for example, an application specific integrated circuit (ASIC), a field programmable gate array (FPGA), a hardware accelerator, or the like.

The client device 106 may, according to certain embodiments, also include a display device/input device 204 and a memory 206 including random access memory (RAM) 208 and read only memory (ROM) 212. This display device/input device 204 may be, for example, a keyboard or pointing device that is used in combination with a monitor. The RAM 208 may include an operating system 210, which may comprise one or more of the non-limiting examples of Windows 2000, Linux, UNIX, and the like. The ROM 212 may be used to store a basic input/output system (BIOS) 214 containing the basic routines that help to transfer information to the different elements within the client device 106.

The client device 106 may, according to various embodiments, further include a storage device 216 for storing a number of client software program(s) 218 (hereinafter, may be referred as client software program application 218), a software program running modules manager 220, and a host program 222. In certain embodiments, the host program 222 may be a web browser. Non-limiting examples of the web browser include, but are not limited to, Internet Explorer, Google Chrome, Safari, Opera, Firefox, and so forth. In any of these and still other embodiments, the storage device 224 may provide nonvolatile storage via one or more of a hard disk drive, a CD drive, and/or an optical disk drive for storing information on various computer-readable media. The computer-readable media could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, or the like. Additionally, each of these storage devices 216 may be connected to the system bus 226 by an appropriate interface.

According to various embodiments, the client device 106 may also connect to the network 104 through a network interface 224, thereby facilitating, as a non-limiting example, interfacing with various computing entities. This communication may be via the same or different wired or wireless networks (or a combination of wired and wireless networks), as discussed above. For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the server 100 may be configured to communicate via wireless external communication networks using any of a variety of protocols, such as 802.11, general packet radio service (GPRS), Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), IEEE 802.11 (Wi-Fi), 802.16 (WiMAX), ultra wideband (UWB), infrared (IR) protocols, Bluetooth™ protocols, wireless universal serial bus (USB) protocols, and/or any other wireless protocol.

The client device 106 also may include a first transceiver 228 configured to send a request for a computer software program logic along with a first list. The first list includes details about one or more modules currently present on the client device 106. Further, the modules can be at least one of one or more code modules or one or more code libraries. The first transceiver 228 is also configured to receive one or more modules for deployment of the computer software program logic from the server 102. In this regard and otherwise, although FIG. 2 shows only certain elements of the client device 106, a person skilled in the art will appreciate that the client device 106 may include one or more additional or alternative elements, as may be desirable for particular applications.

3. Exemplary Server 102 Architecture

FIG. 3 illustrates exemplary structural components of the server 102, in accordance with various embodiments of the present disclosure. In general, the term "server" may refer to, for example, any computer, computing device, mobile phone, desktop, notebook or laptop, distributed system, server, blade, gateway, switch, processing device, or combination of processing devices adapted to perform the functions described herein. As will be understood from this figure, in certain embodiments, the server 102 may include a processor 302 that communicates with other elements within the server 102 via a system interface or a bus 304. The processor 302 may be embodied in a number of different ways. For example, the processor 302 may be embodied as a processing element, a coprocessor, a controller or various other processing devices including integrated circuits such as, for example, an application specific integrated circuit (ASIC), a field programmable gate array (FPGA), a hardware accelerator, or the like.

In a non-limiting exemplary embodiment, the processor 302 may be configured to execute instructions stored in device memory or otherwise accessible to the processor 302. As such, whether configured by hardware or software methods, or by a combination thereof, the processor 302 may represent an entity capable of performing operations according to embodiments of the present disclosure when configured accordingly. In these and other embodiments, a display device/input device 306 for receiving and displaying data may also be included in the server 102. This display device/ input device 306 may be, for example, a keyboard or pointing device that is used in combination with a monitor. The server 102 may, according to various embodiments, further include transitory and non-transitory memory 308, which may include both random access memory (RAM) 310 and read only memory (ROM) 312. The server's ROM 312 may be used to store a basic input/output system (BIOS) 314 containing the basic routines that help to transfer information to the different elements within the server 102.

In addition, according to various embodiments, the server 102 may include at least one storage device 316, such as a hard disk drive, a CD drive, and/or an optical disk drive for storing information on various computer-readable media. The storage device(s) 316 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, or the like. Additionally, each of these storage devices 316 may be connected to the system bus 304 by an appropriate interface.

According to various embodiments, the server 102 may further include a second transceiver 338 configured to receive a request for the computer software program logic along with a first list from at least one of the client devices 106A-N. In certain embodiments, the first list may include details or information about one or more modules currently running on at least one of the client device 106A-N from which the request is received. In other embodiments, the modules may be at least one of one or more software code modules or software code libraries. In any of these and still other embodiments, the second transceiver 338 may be further configured to send the one or more modules required for deployment of the computer software program logic to at least one of the client devices 106A-N.

Furthermore, according to various embodiments, a number of programs, objects, libraries, and program modules may be stored by the various storage devices 316 and/or within the RAM 310 (or other memory). In certain embodiments, such programs and program modules may include an operating system 318, a server runtime assembler program 320, a context control manager 326, an access control manager 328, a cache manager 330, and various other modules (not shown), as may be desirable for particular applications. In at least one exemplary embodiment, the database 322 may store a number of software code modules 334. Further, in these and still other embodiments, the database 322 may include a dependency registry database 332, a software code library repository 336, and so forth. The software code library repository 336 may include a number of software libraries. The dependency registry database 332 may include dependency and prerequisite information about various software code modules 334 and software code libraries. The software code library repository 336 may store the one or more libraries associated with the software code modules 334 (or programs). As discussed in more detail below, these programs, objects, libraries, and modules may control certain aspects of the operation of the server 102 with the assistance of the processor 302 and the operating system 318. Additionally, the server 102 may store or be in communication with one or more databases, such as the dependency registry database 332.

In various embodiments, both software code modules 334 and software code libraries can be registered with the server runtime assembler program 320 or using other means (e.g., via a manual registration process) so that the software code library dependency co-requisites and pre-requisites information is extracted and stored as unique names or lookup keys in the dependency registry database 332. In certain embodiments, the information is extracted and stored in such a way, that this information may easily be retrieved by the server runtime assembler program 320, when a client software program decides that it requires extra functionality using the unique name or lookup key in its request. Additionally, the registration process may store a copy of each software code modules 334 and software code library that will be made available into the software code library repository 336, from which it may easily be retrieved. Thus, in these and still other embodiments, the server runtime assembler program 320 may execute on one or more servers 102 in such a manner that the client device 106 may communicate with it through, for example, a web browser hosted software program.

According to various embodiments, the context control manager 326 may be configured to determine a second list of modules required to implement the computer software program logic. The second list may include information or details about one or more modules including code modules and code libraries required for proper functioning of the computer software program logic on at least one of the client devices 106A-N. Further, the context control manager 326 may be configured to check whether one or more modules in the second list need to be substituted based on their availability in the database 322 of the server 102 or access control on these modules or determined by suitability for the requesting client device. Suitability may be determined by the context control manager 326 having an understanding of the characteristics and capabilities of the device or how or where the device is being used. This may include for example, but not be limited to, the type of CPU or operating system, screen size, input devices supported, sound capability, the location of the device, the time of day etc.

Still further, in various embodiments, the server runtime assembler program 320 may be configured to update the second list based on the check performed. For example, if the required modules are not available in the database 322, then these modules are removed from the second list and details about their alternative modules or substitution modules are added in the second list. In these and other embodiments, the access control manager 328 may be configured to check whether the at least one of the client devices 106A-N have permission rights for accessing modules of the updated second list.

The runtime assembler program 320 may also be configured according to various embodiments to retrieve the modules required to deploy a new functionality or computer software program logic on at least one of the client devices 106A-N from the database 322. The modules may be retrieved based on the permission rights assigned to the at least one of the client devices 106A-N. In these and still other embodiments, the cache manager 330 may store or maintain a copy of the one or more modules of the updated second list for easy retrieval in future.

Also, located within the server 102, in various embodiments, is a network interface 324 for interfacing with various computing entities in the network 104. In certain embodiments, this communication may be via the same or different wired or wireless networks (or a combination of wired and wireless networks), as discussed above. For instance, the communication may be executed using the non-limiting examples of a wired data transmission protocol, such as fiber distributed data interface (FDDI), digital subscriber line (DSL), Ethernet, Asynchronous Transfer Mode (ATM), frame relay, data over cable service interface specification (DOCSIS), or any other wired transmission protocol. Similarly, the server 102 may be configured, according to various embodiments, to communicate via wireless external communication networks using any of a variety of protocols, such as 802.11, general packet radio service (GPRS), Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), IEEE 802.11 (Wi-Fi), 802.16 (WiMAX), ultra wideband (UWB), infrared (IR) protocols, Bluetooth™ protocols, wireless universal serial bus (USB) protocols, and/or any other wireless protocol.

Of course, it should be appreciated that one or more of the server's 102 components may be located remotely from other server components. Furthermore, one or more of the components may be combined and additional or alternative components performing one or more of the functions described herein may be included in the server 102, as may be desirable to one of ordinary skill in the art for use in particular applications.

Exemplary Operation
1. Flowchart of Method 400

FIGS. 4A-4B is a flowchart illustrating a method 400 for receiving computer software program logic on the client computing device 106 from the server 102 in the network 104, in accordance with various embodiments of the present disclosure. As discussed with reference to FIGS. 2-3, the client device 106 can, in certain embodiments, send a request for deploying computer software program logic to the server 102. In at least these embodiments, the server 102 includes the database 322 including a number of software code modules 334 and software code library repository 336. In at least one exemplary embodiment, both software code modules 334 and software code libraries stored in the software code library repository 336 can be registered with the server runtime assembler program 320 or using other means (e.g., via a manual registration process) so that the software code library dependency co-requisites and pre-requisites information is extracted and stored as unique names or lookup keys in the dependency registry database 332. Of course, in these and still other embodiments, the information may be stored in such a way that this information may easily be retrieved by the server runtime assembler program 320 when the client device 106 decides it requires extra functionality using the unique name or lookup key in its request.

At step 402 of various embodiments of method 400, the server 102 may receive a request for the computer software program logic from the client device 106 along with a first list including details about on or more modules currently running on the client device 106. In certain embodiments, the one or more modules can be at least one of software code modules or software code libraries. In these and still other embodiments, upon completion of step 402, at step 404, the context control manager 326 determines a second list including one or more modules required to implement the computer software program logic on the client device 106.

Continuing to step 406 according to various embodiments of method 400, it is checked whether one or more modules of the second list require substitution with some alternative modules based on their availability on the server 102. For example, if at least one module of the second list is not available then an alternative module is searched in the database 322. Thereafter, in certain embodiments, at step 408, the second list is updated based on the check performed at step 406. In these and other embodiments, updating the second list may include removing details of the modules or libraries, which are not available on the server 102, and also adding details of their corresponding alternative modules or libraries in the second list.

Remaining with FIGS. 4A-B, at step 410 according to various embodiments of method 400, it is checked whether the client device 106 has permission rights for accessing one or more of the modules of the updated second list. In certain embodiments, the access control manager 328 may perform this checking, while in other embodiments, alternative means may be employed for this function. In these and still other embodiments, however, at step 412 (see particularly FIG. 4B), the runtime assembler program 320 may retrieve one or more modules based on the access permission rights of the client device 106. Then at step 414, the one or more retrieved modules may be, according to various embodiments, combined into an object. Completion of the method 400 occurs thereafter according to these and still other embodiments, as at step 416, the object may be sent to the client device 106.

2. Flowchart of Method 500

FIGS. 5A-5E is a flowchart illustrating a method 500 for incremental deployment of computer software program logic on the client device 106, in accordance with various embodiments of the present disclosure. As discussed with reference to FIGS. 2-3, the client device 106 may require additional functionality in form of additional software code modules and/or software code libraries.

According to various embodiments, the method 500 begins at step 502, wherein the client software program application 218 running at the client device 106 may require additional functionality in the form of one or more software code modules or computer software program logic. A person skilled in the art will appreciate that the client device 106 may include more than one client software program 218. In certain embodiments, the client software program 218 may request the client software program running modules manager 220 for the new functionality. In these and still other embodiments, the client software program running modules manager 220 may retrieve and load this additional functionality in the form of a software code module or object from the server 102.

Continuing at step 504, a client software program running modules manager 220 may, in various embodiments, receive a request for new functionality as a unique name of a requested module. Thus, in certain embodiments, the client software program running modules manager 220 may examine the client software program application 218 and ascertain which software modules and code libraries are already loaded and may record this information in the form of a first list. Upon completion of step 504, the method 500 proceeds to step 506, during which the client software program running modules manager 220 may, according to various embodiments, prepare the first list of currently loaded modules in the client software program 218. The client software program running modules manager 220 may then communicate with the server 102 and the server runtime assembler program 320.

At step 508 according to various embodiments of method 500, the client software program running modules manager 220 may communicate the first list and unique name of missing required module(s) to the runtime assembler program 320 on the server 102. In certain embodiments, the client software program running modules manager 220 may then request that the server runtime assembler program 320 provide it with the particular module. As part of this request, the client software program running modules manager 220 may, in these and still other embodiments, provide the server runtime assembler program 320 with the first list including information about all the running modules and running code libraries that it created earlier.

In various embodiments, the server runtime assembler program 320 may seek to apply context sensitive selection or substitution of software modules and software code libraries based on context (e.g., at the client's request). In such instances, at step 510, it is checked whether the server runtime assembler program 320 wishes to apply context sensitive selection or substitution of software modules and software code libraries based on context. If the context sensitive selection need to be applied then step 512 (see FIG. 5B) is executed; otherwise the method 500 proceeds to step 532 (see FIG. 5D).

Figure 5A:
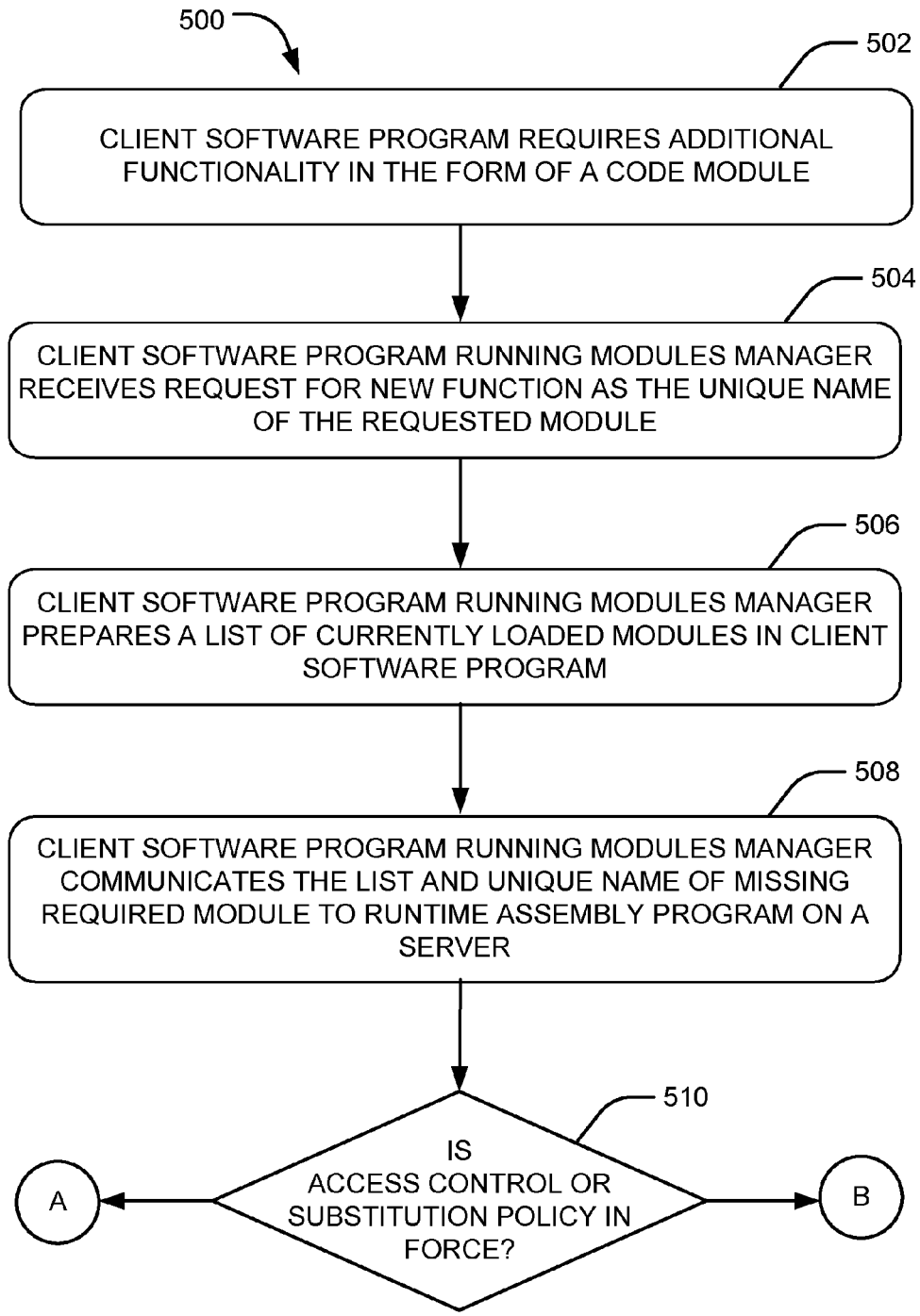
Figure 5B:
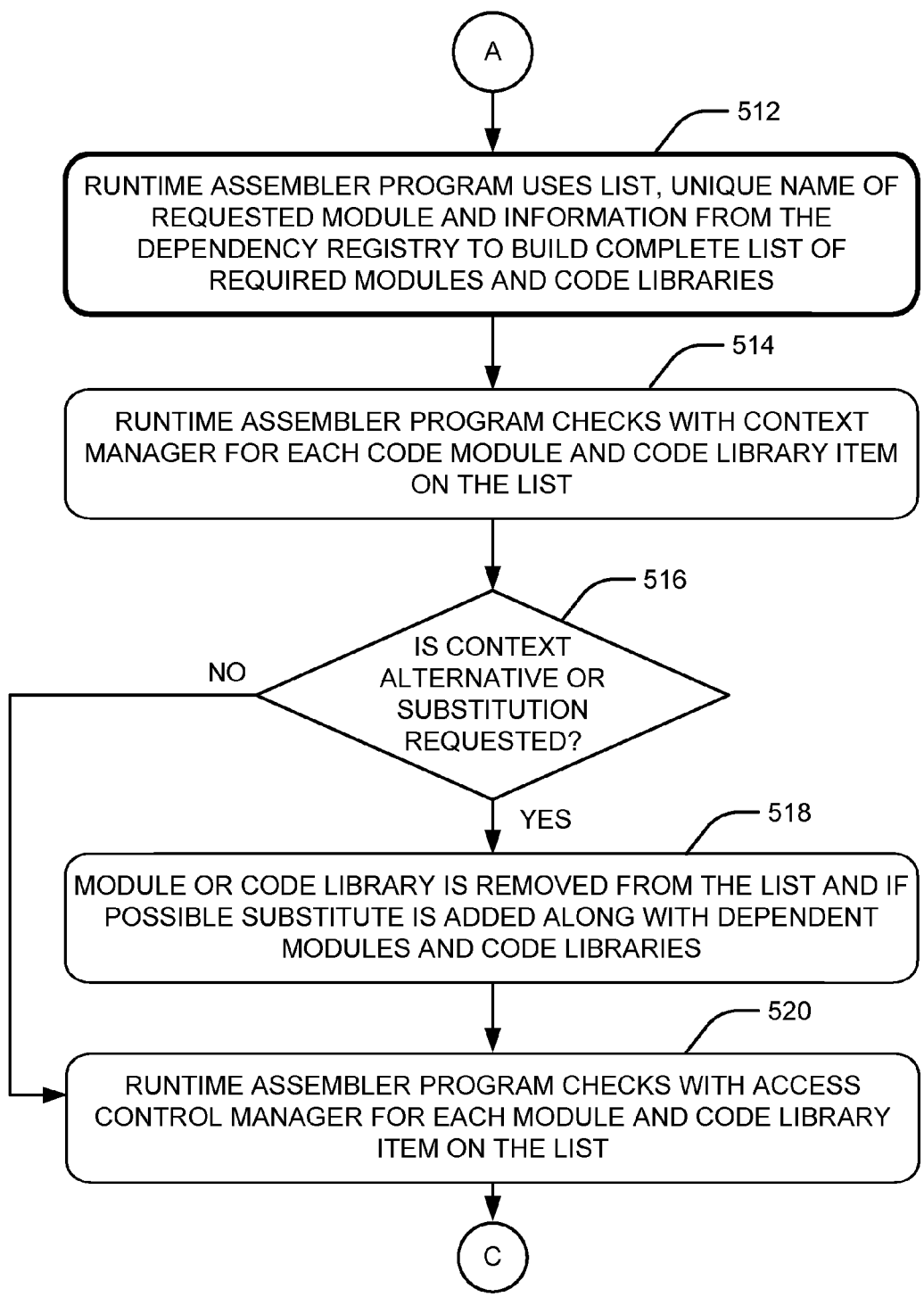

With reference to FIG. 5B, at step 512 according to various embodiments, the server runtime assembler program 320 may use the supplied first list of all the running modules and running code libraries, along with dependency information for each software module and software code library and all their dependencies, by using the unique name of each to build a second list of all software modules. Such may be, according to various embodiments, required by the client software program application 218 to achieve the new function requested or to deploy the requested computer software program logic. In these and still other embodiments, the running modules and running code libraries refers to software code modules and libraries currently present on the client device 106. It should be understood however, that such may be achieved by, for example, accessing the dependency registry database 332 containing dependency and pre-requisite information of the software code modules and software code libraries.

At step 514 of various embodiments, as shown in FIG. 5B, the server runtime assembler program 320 may further check with the context control manager 326 against each item on this list. Then, in certain embodiments, at step 516, whether a context alternative or substitute module is requested is checked. It should be understood that in these and still other embodiments, the substitute is a module which is similar to or equivalent in functionality to some other module that can be replaced with the substitute module. If outcome of the check performed at step 514 is yes then step 518 is executed; otherwise control and the method 500 proceeds to step 520.

Remaining with FIG. 5B, at step 518 according to various embodiments, one or more software modules and code libraries identified during the checks with the context control manager 226 are removed from the second list. If a more contextually suitable alternative software modules or code library exists, then such and their dependencies are located using the dependency registry database 332 and substituted (for example, a more targeted language specific library might be substituted for a default one) and added to the second list.

At step 520, whether encountered via step 516 or 518 according to various embodiments, the runtime assembler program 320 checks with access control manager 328 for each module and code library item on the second list. In certain embodiments, access control (e.g., restricted or substituted access) or permission rights to software modules and software code libraries policy is enforced. In these and other embodiments, the server runtime assembler program 320 may use the supplied list of all the running modules and running code libraries along with dependency information for each software module and software code library and all their dependencies. This may be achieved by accessing the dependency registry database 332 containing software code modules and software code library dependency and pre-requisite information by using the unique name of each, to update the second list of all software modules and code libraries required by the client software program application 218 to achieve the new function requested.

Figure 5C:
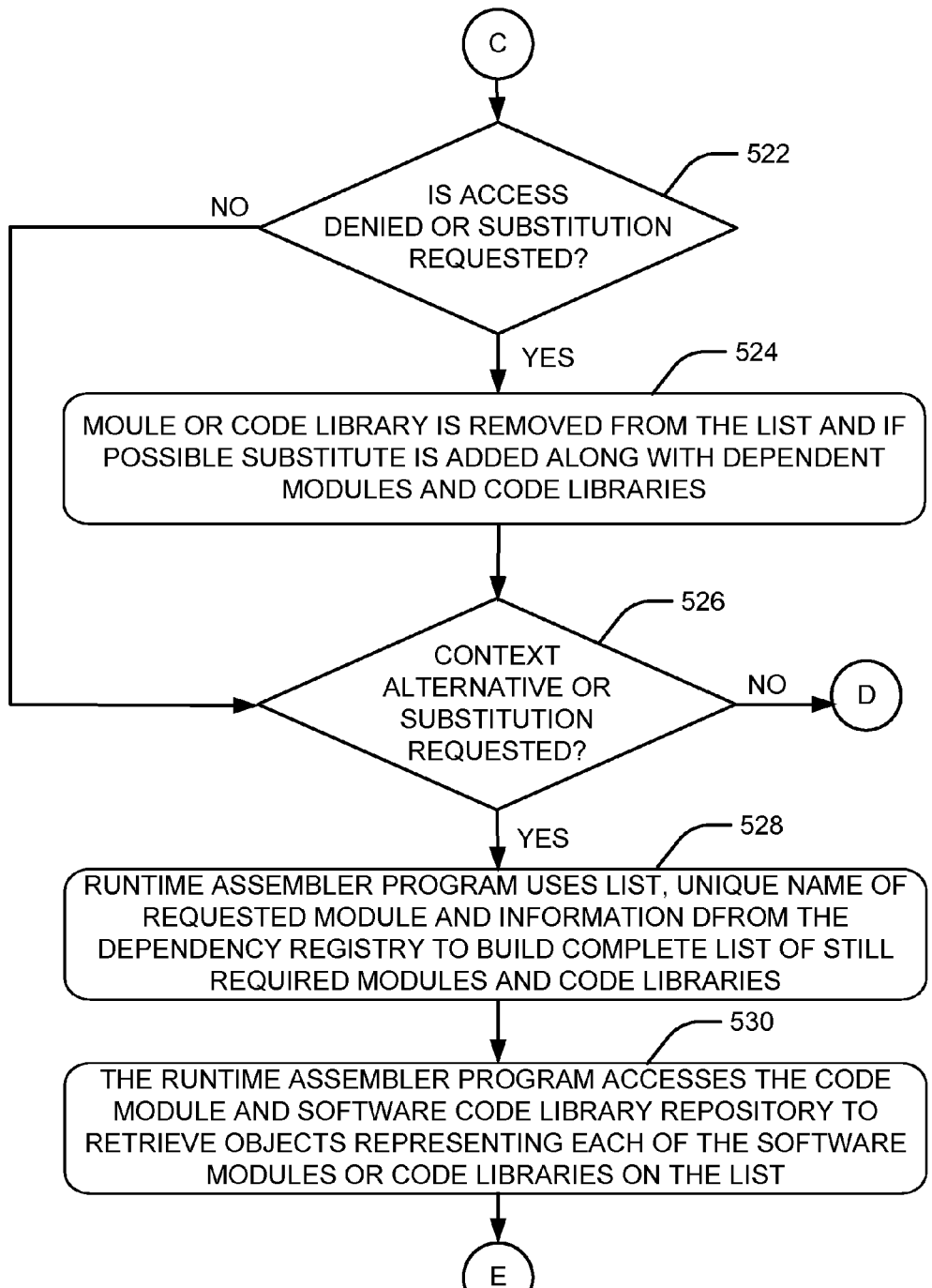

Turning now to FIG. 5C, upon completion of step 520, the method 500 proceeds to step 522, during which the server runtime assembler program 320 may, according to various embodiments, check the access control manager 328 against each item on the second list. At step 524, access controlled software modules (e.g., restricted or otherwise) and code libraries, as identified during the checks with the access control manager 328, are removed from the second list if access is denied and/or substitution is requested; otherwise the method 500 proceeds directly to step 526, as described in further detail below.

Turning now to step 526 according to various embodiments, as illustrated in FIG. 5C, it is checked if an alternative substitution is requested or required. If substitution is required then step 528 is executed; otherwise the method 500 and control thereof goes to step 532 of FIG. 5D. At step 532 alternative software modules and code libraries, and their dependencies, are located using the dependency registry database 332 and substituted. For example, a code library implementing a weaker cryptographic function might be substituted for a stronger one and added to the second list. In certain embodiments, the server runtime assembler program 320 may then use the first list of along with dependency information for each software module and software code library and all their dependencies to build an updated second list including all software modules and code libraries still required by the client software program application 218 to achieve the new functionality (or the requested computer software program logic). The runtime assembler program 320 may use dependency information from the dependency registry database 332 to update the second list with alternative modules.

Returning now to steps 528 and 530 of FIG. 5C, during step 530 the server runtime assembler program 320 may call the software code modules 334 and software code library repository 336 to retrieve objects representing each of the software modules or code libraries on the updated second list. These can then be combined into an object that the server runtime assembler program 320 returns to the client software program running modules manager 220 at step 546 (see FIG. 5E). In certain embodiments, the object is returned to a web browser on the client device 106. Thereafter, at step 548 (see again FIG. 5E), the client software program running modules manager 220 loads the newly returned code objects into the client software program application 218, and/or handling the errors caused by the restricted access to the software module or code libraries resulting in not being available or from a substitute set of modules and code libraries supplied instead because of the context.

Figure 5D:
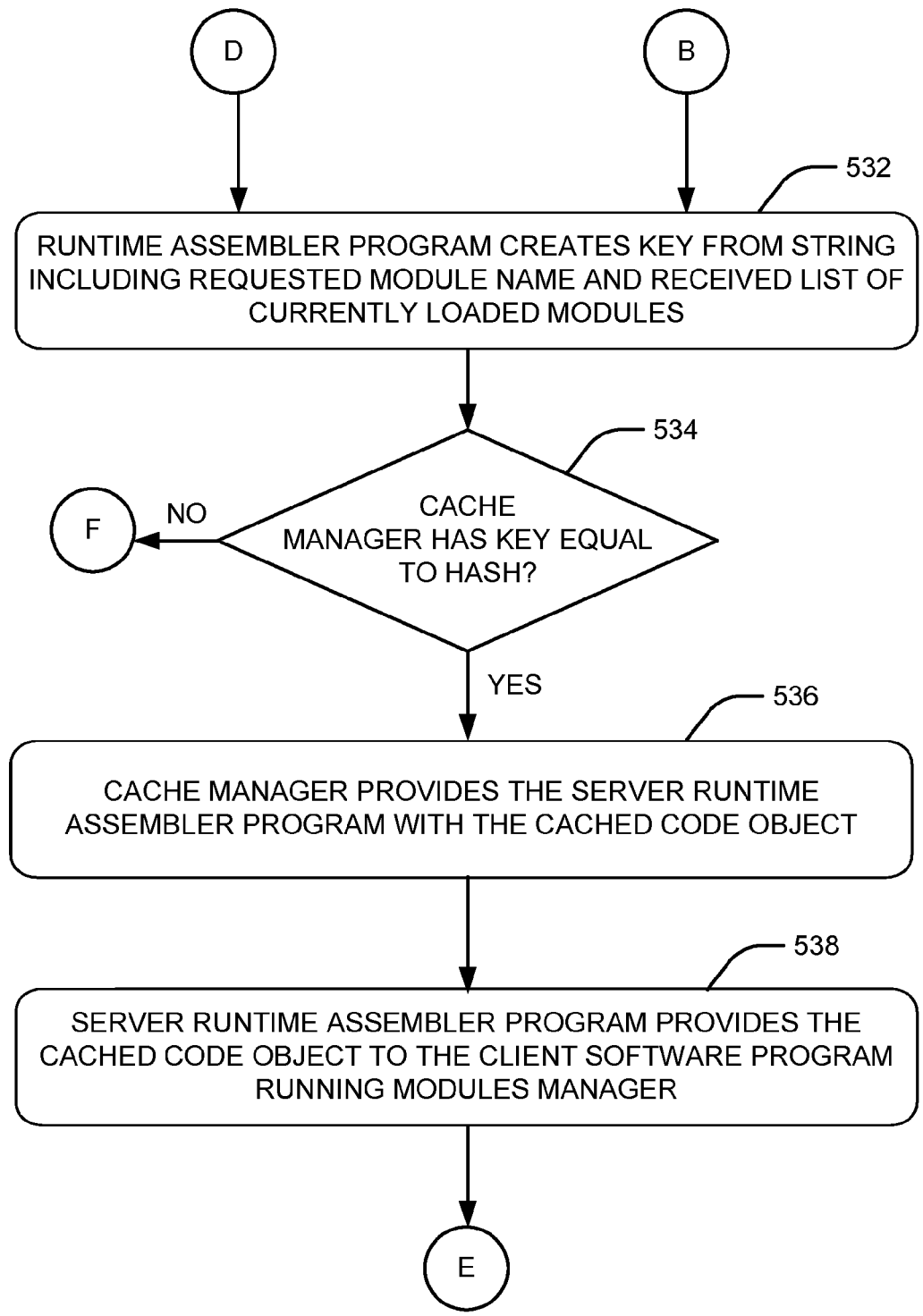

Returning now to FIGS. 5A and 5C, if at step 510 or 526, if no access or context sensitive control with substituted access to software modules and software code libraries is required, then step 532 of FIG. 5D is executed. At step 532 according to various embodiments, the server runtime assembler program 320 may create a hash key out of a string created by combining a sorted list of unique names of all the running modules and running code libraries provided by the client software program running modules manager 220 and the name of the requested module using, for example, the SHA1 cryptographic hash function or a suitable alternative. In certain embodiments, the server runtime assembler program 320 checks with the cache manager 330 to see if there is any cached object in the cache already that corresponds with the newly calculated key.

Remaining with FIG. 5D according to various embodiments, at step 534, if there is a match for the key, then step 536 is followed; otherwise method 500 and control thereof proceeds to step 540. At step 536, the cache manager 330 may in certain embodiments provide the server runtime assembler program 320 with the cached code object i.e. the cached copy of requested modules. Thereafter, at step 538 according to these and still other embodiments, the server runtime assembler program 320 may send or provide the cached control object to the client software program running modules manager 220 through the host program 222 such as a Web browser software program. The client software program running modules manager 220 is then responsible for loading the newly returned code objects into the client software program application 218 at step 548. In at least one exemplary embodiment, this may be the most efficient manner of serving out additional software modules and supporting code libraries in a situation in which there are many connected client software program application(s) 218 evolving their functionality along similar lines.

Figure 5E:
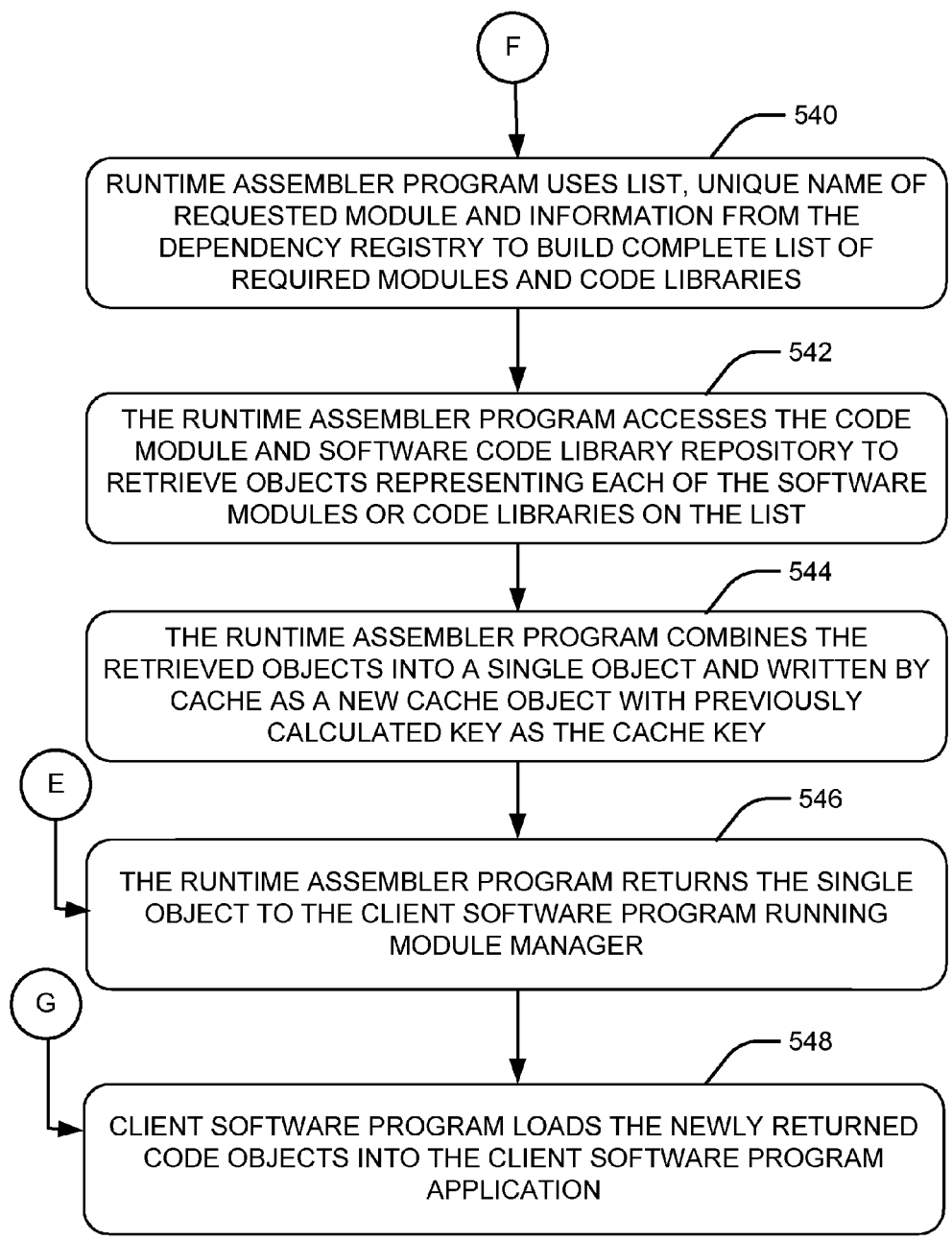

If at step 534 of FIG. 5D, according to various embodiments, there is no match for the hash key, the server runtime assembler program 320 may use the first list including details about all the running modules and running code libraries along with dependency information for each software module and software code library and all their dependencies to build a list (i.e. second list) of all software modules and code libraries still required by the client software program application 218 at step 540 (see FIG. 5E).

With reference now to FIG. 5E, at step 542 according to various embodiments, the server runtime assembler program 320 accesses the software code modules 334 and software code library repository 336 to retrieve objects representing each of the software modules or code libraries on the list. At step 544, the retrieved objects may be combined into an object and written by the cache manager 330 to the cache as a new cache object with the previously calculated SHA1 hash (or alternative) as the cache key. In these and still other embodiments, this method may effectively populate the cache with cache objects so that similar future requests may be more efficiently met directly from the cache and without the assembly step.

At step 546 according to various embodiments, the server runtime assembler program 320 or the second transceiver 338 may return the same object calculated in the previous step to the client software program running modules manager 220 through the Web browser software program (for example). In these and still other embodiments, at step 548, the client software program running modules manager 220 is then responsible for loading the newly returned code objects into the client software program application 218.

In various embodiments, the cache manager 330 maintains a copy of all the retrieved objects or modules that can be archived and used in evolved client software program(s) 218 in future. In cases in which there are individually (e.g., by a user, a program, or a user group) evolving client software program(s) 218 that are downloaded from scratch each time they are used (e.g., JavaScript libraries are to a Web browser program when a web application is visited), the following optimization can be used to avoid unnecessary delays the next time a particular combination of the client computer software program(s) 218 updates is individually required, effectively totaling an evolved client software program as a single unit.

At any point during the life cycle of a client software program application 218, but most optimally during shutdown of the client software program(s) 218, the client software program running modules manager 220 may, according to various embodiments, post a list of the currently loaded running modules in the client software program(s) 218. This information may also be calculated directly by the server runtime assembler program 220 at any point a request for a module is made by a client software program(s) 218 that is accompanied by a list of its running modules created by the client software program running modules manager 220 and added to during the course of its serving out the requested module and its dependencies or by keeping records of such transactions. This information is recorded by the server runtime assembler program 320 which may use this information and its access to the software code modules 334 and software code library repository 336 to create an object containing all the software program code necessary to recreate the evolved client software program(s) 218. The server runtime assembler program 320 can interact with the cache manager 330 to store this new cache object along with an appropriate cache key, for example an associated user login id or user group name. During future startups of the client software program application 218 when the program code may be redeployed to the host client runtime, this cached object can be retrieved and served out directly by the server runtime assembler program 320 instead of the original, non-evolved client software program application 218, thereby restoring for individual use each evolved software program application to the users or client programs that evolved them on a case-by-case basis.

Various Applications and Benefits of Systems and Methods

In various embodiments, the above-described features may provide certain benefits or advantages. For example, in various embodiments, the above-described features may satisfy on-demand requests from the client software for additional program functionality. Further the disclosed systems and methods may in certain embodiments reduce the size of the software code necessary for download at the client computing device and reduce the amount of disruption in loading. This includes taking into account dependent software code libraries and software modules shared between downloaded software modules and software code libraries, making it unnecessary for them to be re-downloaded. Also, the disclosed methods and systems may in these and still other embodiments limit issues related to loading the same software modules and software code libraries into the client program more than once.

The systems and methods provided in various embodiments of the present disclosure may also be used to restrict and control access to software code modules and software code libraries on a per-user basis, including the substituting of alternative software code modules and software code libraries on a per-user or group basis, if appropriate. Further, the disclosed methods make, in these and still other embodiments, the process of serving the additional software program functionality as efficient as possible from the point of view of a server runtime assembler program 320 and its potential for scalability in the face of a large number of simultaneously connected client software programs.

The disclosed systems and methods according to various embodiments also provide environmental context or specific end-user (or to a group of users) appropriate software code modules and software code libraries on an individualized basis. For example, including the substitution of alternative languages, geographic regional specifics, functional context (machine type, time of day), user disability specific function etc. Further, certain embodiments of the present disclosure address the case of individually (person, program or group) evolving client software programs that are downloaded from scratch each time they are used (as for example JavaScript libraries are to a Web browser program when a web application is visited), to avoid unnecessary delays the next time a particular newly evolved combination of client computer program software is required by a user.

Various embodiments of the present disclosure also allow the necessary additional software program logic function modules that can be used to extend the client software program dependent on functionality that is included in additional computer program libraries that may also need to be provisioned down to the client. These code libraries may themselves be dependent on further code libraries and so on.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

Those in the art will understand that the steps set out in the discussion above may be combined or altered in specific adaptations of the disclosure. The illustrated steps are set out to explain the embodiment shown, and it should be anticipated that ongoing technological development will change the manner in which particular functions are performed. These depictions do not limit the scope of the present disclosure, which is determined solely by reference to the appended claims.

What is claimed is:

1. A method for requesting a computer software program logic by a client computing device from a server in a network, the method at the server comprising:
   receiving, via at least one processor, a request for computer software program logic from a client computing device along with a first list comprising details about one or more modules running on the client computing device;
   determining, via the at least one processor and based at least in part on the first list, a second list comprising details of one or more modules required to deploy the computer software program logic on the client computing device;
   checking, via the at least one processor, whether the one or more modules of the second list need to be substituted based on:
      an availability of the one or more modules of the second list on the server, and
      suitability of the one or more modules of the second list, the suitability associated with a characteristic of the client computing device, a capability of the client computing device, and a usage of the client computing device, wherein:
         the characteristic of the client computing device includes at least one of:
            a type of CPU associated with the client computing device,
            a type of operating system associated with the client computing device,
            a screen size associated with the client computing device;
         the capability of the client computing device includes at least one of:
            input devices supported by the client computing device,
            sound capability associated with the client computing device; and the usage of the client computing device includes at
least one of:
a location associated with the client computing
device, and
a time of day associated with the request from the
client computing device;
updating, via the at least one processor, the second list
based at least in part on the check performed;
checking, via the at least one processor, whether the client
computing device has permission rights for accessing
the one or more modules of the updated second list; and
transmitting, via the at least one processor, an object
comprising the one or more modules of the updated
second list that are not on the first list to the client
computing device based at least in part on the check
performed, wherein the updated second list comprises
details of the one or more modules required for deployment of computer software program logic on the client
computing device.

2. The method of claim 1, further comprising retrieving the one or more modules of the updated second list from a database on the server, wherein the retrieving is based at least in part on at least one of the permission rights assigned to at least one of the client computing device and one or more users associated with the client computing device.

3. The method of claim 1, wherein determining the second list further comprises analyzing the one or more modules of the first list to build the second list.

4. The method of claim 1, further comprising:
checking whether a user associated with the client computing device has permission rights for accessing the one or more modules of the updated second list; and
updating the second list based on the check performed, wherein updating comprises:
removing the one or more modules to which the user does not have access permission rights from the second list; and
adding details of one or more substitute modules corresponding to the removed one or more modules in the second list.

5. The method of claim 1, wherein updating the second list comprises:
removing the one or more modules to which the client computing device does not have access permission rights from the second list; and
adding details of one or more substitute modules corresponding to the removed one or more modules in the second list.

6. The method of claim 2, further comprising combining at least the retrieved modules into the object that is sent to the client computing device.

7. The method of claim 1, further comprising storing a copy of each of the one or more modules of the second list in the memory of the server.

8. A computer software program logic deployment system comprising:
a client computing device comprising a first transceiver configured to:
send a request for a computer software program logic along with a first list comprising details about one or more modules running on the client computing device; and
receive an object comprising one or more modules required for deployment of the computer software program logic that are not on the first list; and
a server comprising:
a second transceiver configured to:
receive a request for the computer software program logic along with the first list from the client computing device; and
send an object including the one or more modules required for deployment of the computer software program logic to the client computing device that are not on the first list;
a memory comprising a database configured to store modules comprising software code modules and code libraries;
a runtime assembler program configured to:
determine a second list including details about one or more modules required to deploy the computer software program logic; and
update the second list by, wherein updating comprises:
removing the one or more modules to which the client computing device does not have access permission rights from the second list; and
adding details of one or more substitute modules corresponding to the removed one or modules in the second list;
a context control manager configured to check whether one or more modules of the second list need to be substituted based on:
at least one of context or availability of one or more modules of the second list on the server, and
suitability of the one or more modules of the second list, the suitability associated with a characteristic of the client computing device, a capability of the client computing device, and a usage of the client computing device, wherein:
the characteristic of the client computing device includes at least one of:
a type of CPU associated with the client computing device,
a type of operating system associated with the client computing device,
a screen size associated with the client computing device;
the capability of the client computing device includes at least one of:
input devices supported by the client computing device,
sound capability associated with the client computing device; and
the usage of the client computing device includes at least one of:
a location associated with the client computing device, and
a time of day associated with the request from the client computing device; and
an access control manager configured to check whether the client computing device has permission rights for accessing one or more modules of the second list and the updated second list.

9. The system of claim 8, wherein the runtime assembler program is further configured to analyze the one or more modules of the first list to build the second list.

10. The system of claim 8, wherein the runtime assembler program is further configured to retrieve the one or more modules of the updated second list from a database on the server based on the permission rights assigned to at least one of the client computing device or one or more users associated with the client computing device.

11. The system of claim 10, wherein the runtime assembler program is further configured to combine the retrieved one or more modules into the object that is sent to the client computing device.

12. The system of claim 8, wherein the server further comprising a cache manager configured to store a copy of the one or more modules of the second list in the memory of the server.

13. The system of claim 8, wherein the access control manager is further configured to:
  check whether a user associated with the client computing device have permission rights for accessing the modules of the updated second list; and
  update the second list based on the check performed, wherein updating comprises:
    removing the one or more modules to which the user does not have access permission rights from the second list; and
    adding details of one or more substitute modules corresponding to the removed one or modules in the second list.

14. A non-transitory computer program product comprising at least one computer readable medium having computer-readable program code portions embodied thereon to perform business center operations, the computer-readable program code portions being configured to perform the steps of:
  receiving a request for computer software program logic from a client computing device along with a first list comprising details about one or more modules running on the client computing device;
  determining a second list comprising details about one or more modules required to deploy the computer software program logic on the client computing device, wherein the second list is based at least in part on the first list;
  checking whether the one or more modules of the second list need to be substituted based on:
    an availability of the one or more modules of the second list on the server, and
    suitability of the one or more modules of the second list, the suitability associated with a characteristic of the client computing device, a capability of the client computing device, and a usage of the client computing device, wherein:
      the characteristic of the client computing device includes at least one of:
        a type of CPU associated with the client computing device,
        a type of operating system associated with the client computing device,
        a screen size associated with the client computing device;
      the capability of the client computing device includes at least one of:
        input devices supported by the client computing device,
        sound capability associated with the client computing device; and
      the usage of the client computing device includes at least one of:
        a location associated with the client computing device, and
        a time of day associated with the request from the client computing device;
  updating the second list based on the check performed;
  checking whether the client computing device has permission rights for accessing the one or more modules of the updated second list; and
  sending an object comprising the one or more modules of the updated second list that are not on the first list to the client computing device based on the check performed, wherein the updated second list comprises details about the one or more modules required for deployment of computer software program logic on the client computing device.

15. The computer program product of claim 14, wherein determining the second list further comprises analyzing the one or more modules of the first list to build the second list.

16. The computer program product of claim 14 further comprising computer-readable program code portions configured for:
  checking whether a user associated with the client computing device has permission rights for accessing the modules of the updated second list; and
  updating the second list based on the check performed, wherein updating comprises:
    removing the one or more modules to which the user does not have access permission rights from the second list; and
    adding details of one or more substitute modules corresponding to the removed one or modules in the second list.

17. The computer program product of claim 14, wherein updating the second list comprises:
  removing the one or more modules to which the client computing device does not have access permission rights from the second list; and
  adding details of one or more substitute modules corresponding to the removed one or modules in the second list.

18. The computer program product of claim 17, further comprising computer-readable program code portions configured for retrieving the one or more modules of the updated second list from a database on the server based on at least one of the permission rights assigned to at least one of the client computing device and one or more users associated with the client computing device.

19. The computer program product of claim 18, further comprising computer-readable program code portions configured for combining the retrieved modules into the object that is sent to the client computing device.

20. The computer program product of claim 14, further comprising computer-readable program code portions configured for storing a copy of each of the one or more modules of the second list in the memory of the server.

* * * * *